United States Patent
Cui

(10) Patent No.: US 12,291,257 B2
(45) Date of Patent: *May 6, 2025

(54) FRAME OF DOUBLE-PERSON BABY CARRIAGE AND FRAME FOLDING MECHANISM THEREOF

(71) Applicant: WONDERLAND SWITZERLAND AG, Steinhausen (CH)

(72) Inventor: Zongwang Cui, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,661

(22) Filed: Aug. 16, 2023

(65) Prior Publication Data

US 2023/0391391 A1   Dec. 7, 2023

Related U.S. Application Data

(63) Continuation of application No. 17/391,681, filed on Aug. 2, 2021, now Pat. No. 11,772,698.

(30) Foreign Application Priority Data

Aug. 3, 2020  (CN) .......................... 202010768620.5

(51) Int. Cl.
*B62B 7/06*   (2006.01)
*B62B 7/00*   (2006.01)
(Continued)

(52) U.S. Cl.
CPC ............. *B62B 7/068* (2013.01); *B62B 7/008* (2013.01); *B62B 7/062* (2013.01); *B62B 9/12* (2013.01); *B62B 9/20* (2013.01)

(58) Field of Classification Search
CPC ......... B62B 7/068; B62B 7/008; B62B 7/062; B62B 9/12; B62B 9/20
See application file for complete search history.

(56) References Cited

U.S. PATENT DOCUMENTS 5,915,723 A  *  6/1999  Austin ...................... B62B 3/02
                                                                  280/47.35
9,896,118 B2 *  2/2018  Choi ........................ B62B 3/007
(Continued)

FOREIGN PATENT DOCUMENTS

CN         102616266 A     8/2012
CN         107848553 A     3/2018
(Continued)

OTHER PUBLICATIONS

Mechanical translation of CN110356448. (Year: 2019).*
(Continued)

*Primary Examiner* — John D Walters
(74) *Attorney, Agent, or Firm* — Volpe Koenig

(57) ABSTRACT

The application discloses a frame of double-person baby carriage and a frame folding mechanism thereof. The frame folding mechanism comprises an upper link, a lower link, a middle upright rod, two upper supporting rods, two lower supporting rods and two foot frames. The upper link and the lower link are spaced apart in a vertical direction; the middle upright rod is vertically connected between the upper link and the lower link; first ends of the two upper supporting rods are pivotally connected to both ends of the upper link; first ends of the two lower supporting rods are pivotally connected to both ends of the lower link; the foot frames are arranged in a vertical direction, top ends of the foot frames are pivotally connected to second ends of the upper supporting rods, bottom ends of the foot frames are pivotally connected to second ends of the lower supporting rods.

22 Claims, 17 Drawing Sheets

(51) Int. Cl.
*B62B 9/12* (2006.01)
*B62B 9/20* (2006.01)

(56) References Cited

U.S. PATENT DOCUMENTS

| | | | |
|---|---|---|---|
| 10,464,588 B1 * | 11/2019 | Lin | B62B 7/08 |
| 11,091,183 B2 * | 8/2021 | Wu | B62B 3/007 |
| 2008/0143082 A1 | 6/2008 | Chen et al. | |
| 2018/0297622 A1 | 10/2018 | Chen et al. | |
| 2020/0031376 A1 | 1/2020 | Horowitz | |

FOREIGN PATENT DOCUMENTS

| | | | | |
|---|---|---|---|---|
| CN | 108313110 A | | 7/2018 | |
| CN | 110356448 A | * | 10/2019 | B62B 3/02 |
| KR | 20160118839 A | | 10/2016 | |

OTHER PUBLICATIONS

Office Action issued in Taiwanese Patent Application No. 110128499 dated Feb. 17, 2023.
"First Office Action Issued in Corresponding Chinese Patent Application No. 202010768620.5", Mailed Date: Mar. 22, 2024, 18 pages.

* cited by examiner

FRAME OF DOUBLE-PERSON BABY CARRIAGE AND FRAME FOLDING MECHANISM THEREOF

CROSS REFERENCE TO RELATED APPLICATIONS

This application is a continuation of U.S. patent application Ser. No. 17/391,681, filed Aug. 2, 2021, which claims the benefit of Chinese Patent Application No. 202010768620.5, filed on Aug. 3, 2020, the entire contents thereof are incorporated herein by reference.

TECHNICAL FIELD

The present disclosure relates to baby carriers, and particularly to a frame of double-person baby carriage and a frame folding mechanism thereof.

BACKGROUND OF THE INVENTION

With the development of science and technology and the progress of humanities, extremely rich material consumer goods are provided for people's life, and baby carrier is one of many material consumer goods. Baby carrier plays an important role when adult and baby go out, because on the one hand, the hand of adult is freed and the burden is reduced, and on the other hand, the baby can have a more comfortable posture. So baby carrier is sought after by consumers year by year. As people's demand for baby carrier continues to increase, the structure and craftsmanship of baby carrier is improved year by year to meet people's material and cultural needs.

Common baby carrier comprises single-person baby carriage and double-person baby carriage. Among them, the double-person baby carriage includes front-rear arranged double-person baby carriage and left-right arranged double-person baby carriage. The front-rear arranged double-person baby carriage is more popular with consumers because of its advantages of small space occupation and flexible steering.

The left-right arranged double-person baby carriage currently available on the market cannot be folded at any time, so the existing baby carriage occupies space when it is not in use.

Therefore, there is an urgent need for a frame of double-person baby carriage and its frame folding mechanism that is foldable, convenient to carry, and takes up less space to overcome the above-mentioned drawbacks.

SUMMARY OF THE INVENTION

An object of the disclosure is to provide a frame folding mechanism which is foldable, convenient to carry, and takes up less space.

Another object of the disclosure is to provide a frame of double-person baby carriage which is foldable, convenient to carry, and takes up less space.

In order to achieve the above-mentioned objects, the frame folding mechanism of the disclosure comprises an extended position and a folded position. The frame folding mechanism of the disclosure comprises an upper link, a lower link, a middle upright rod, two upper supporting rods, two lower supporting rods and two foot frames. The upper link and the lower link are arranged in parallel in the horizontal direction and spaced apart in the vertical direction. The middle upright rod is vertically connected between the upper link and the lower link. First ends of the two upper supporting rods are respectively pivotally connected to both ends of the upper link. First ends of the two lower supporting rods are respectively pivotally connected to both ends of the lower link. The foot frames are arranged in a vertical direction. Top ends of the foot frames are pivotally connected to second ends of the upper supporting rods, and bottom ends of the foot frames are pivotally connected to second ends of the lower supporting rods. When the two foot frames move in a front-rear direction, the first ends of the upper supporting rods are pivoted in respect to the upper link and the second ends of the upper supporting rods are pivoted in respect to the top ends of the foot frames, the first ends of the lower supporting rods are pivoted in respect to the lower link and the second ends of the lower supporting rods are pivoted in respect to the bottom ends of the foot frames, and the upper link, the lower link and the middle upright rod simultaneously move in a vertical direction during pivoting of the upper supporting rods and the lower supporting rods, so that the frame folding mechanism is switched between the extended position and the folded position.

Preferably, the frame folding mechanism of the disclosure further comprises a first positioning member which selectively resists below the upper link.

Preferably, the first positioning member includes a slider and two linkage rods, the slider is slidably disposed on the middle upright rod, one end of the two linkage rods are pivotally connected to the slider, and the other end of the two linkage rods are pivotally connected to the lower supporting rods.

Preferably, the slider has a locating position in respect to the middle upright rod, when the slider is located at the locating position, the slider resists below the upper link, and when the slider moves away from the locating position, vertical movement of the slider brings the linkage rods to pivot.

Preferably, a pivot point of the linkage rods and the slider, a pivot point of the linkage rods and the lower supporting rods and a pivot point of the lower supporting rods and the lower link together constitute three points of a triangle.

Preferably, the pivot point of the linkage rods and the lower supporting rods is located between the pivot point of the lower supporting rods and the foot frames and the pivot point of the lower supporting rods and the lower link.

Preferably, when the slider is located at the locating position, the slider is further locked and connected to the upper link.

Preferably, the frame folding mechanism of the disclosure further comprises an unlocking member which is movably disposed on the upper link.

Preferably, the unlocking member is slidably disposed on upper link to be switched between a locked position and an unlocked position.

Preferably, the frame folding mechanism of the disclosure further comprises an elastic member which is located between the unlocking member and the upper link, and the elastic member always tends to drive unlocking member to slide to the locked position.

Preferably, the unlocking member includes a lock part, and the slider includes a sub-lock part, the lock part is selectively engaged with the sub-lock part.

Preferably, one of the sub-lock part and the lock part has a concave structure, and the other one of the sub-lock part and the lock part has a convex structure, the convex structure selectively extending into the concave structure to lock the slider and the unlocking member.

Preferably, there are at least two sub-lock parts and at least two lock parts.

Preferably, the lock part has a first inclined surface, and the sub-lock part has a second inclined surface cooperating with the first inclined surface.

Preferably, the frame folding mechanism of the disclosure further comprises the frame folding mechanism further comprises a second positioning member fixedly connected to one end of the foot frame, and when the frame folding mechanism is in the folded position, the second positioning member is coupled to the two foot frames so as to fix the two foot frames relatively.

Preferably, the second positioning members include an engage block and a convex post, one of the two foot frames is provided with the engage block, and the other one of the two foot frames is provided with the convex post, the engage block is provided with an elongated hole, and the convex post is clamped in the elongated hole.

The frame of double-person baby carriage of the disclosure comprises a handle, wheels, a first connecting rod, a second connecting rod, and two aforementioned frame folding mechanisms, the two frame folding mechanisms are symmetrically arranged on the left and right sides respectively, each of the bottoms of the foot frames is connected to one wheel, the first connecting rod is connected between the two upper supporting rods, the second connecting rod is connected between the two lower supporting rods, the handle is pivotally connected to the upper supporting rod or the first connecting rod.

Preferably, the frame of double-person baby carriage of the disclosure further comprises a dining tray which is arranged between the two upper links.

Preferably, the dining tray is clamped between the two upper links when the frame folding mechanism is in the folded position.

Preferably, dining tray the dining tray includes two single dining areas and a common dining area, and the common dining area is located between the two single dining areas.

Preferably, both the single dining areas and the common dining area include concave structures with upward openings.

Preferably, a head end of the handle extends into the lower supporting rod, a tail end of the handle is pivotally connected to the lower supporting rod or the second connecting rod, a sliding sleeve is sleeved on the handle and is slidably disposed on the handle, and the sliding sleeve is further pivotally connected to the upper supporting rod or the first connecting rod.

Preferably, the handle includes a holding tube, and a cross-sectional shape of the holding tube gradually changes from a circle to an ellipse in a direction from the inside to the outside.

Preferably, the frame of double-person baby carriage of the disclosure further comprises a handle adjustment mechanism for locking or unlocking a position of the handle, when the handle adjustment mechanism unlocks the handle, the handle is pivotable in respect to the upper supporting rod or the first connecting rod; when the handle adjustment mechanism locks the handle, the handle is fixed in respect to the upper supporting rod or the first connecting rod.

Preferably, the handle adjustment mechanism includes a first joint, a second joint and a driving member, the first joint is pivotally connected to the second joint via a pivot, the second joint is axially movable in respect to the first joint to lock or unlock the first joint, the driving member is sleeved on the pivot and located between the first joint and the second joint, the driving member is rotatable in respect to the pivot, rotating of the driving member links the second joint to move in respect to the first joint, so as to lock or unlock the first joint, the first joint is fixedly connected to the upper supporting rod and/or the first connecting rod, the second joint is fixedly connected to the handle.

Preferably, the handle adjustment mechanism further includes an unlock operating member disposed on the handle, the unlock operating member links the driving member to perform a rotation motion around the pivot.

Preferably, the handle adjustment mechanism further comprises a linkage member, one end of the linkage member being connected to the unlock operating member, and the other end of the linkage member being connected to the driving member.

Preferably, one of the first joint the second joint includes a locking part, and the other one of the first joint and the second joint includes a sub-locking part engaged with the locking part.

Preferably, the locking part is a gear, the sub-locking part is a gear groove, and the second joint moves axially to cause the sub-locking part engages or disengages with the locking part.

Preferably, rotating of the driving member pushes the second joint away from the first joint to unlock.

Preferably, the driving member includes a protruding part, the second joint includes a long driving groove cooperating with the protruding part, and rotating of the driving member causes the protruding part to slide alone the long driving groove to push the long driving groove, so as to push the second joint.

Preferably, a bottom of the long driving groove is gradually inclined inward along a rotation direction of the protruding part.

Preferably, the handle adjustment mechanism further includes an elastic resetting member disposed between the second joint and the driving member, and the elastic resetting member always tends to drive the second joint and the first joint to lock.

Preferably, the unlock operating member includes a housing sleeved on the handle, an operating part movable in respect to the housing, and a pivoting member, the housing has a receiving cavity, the pivoting member is located in the receiving cavity, the pivoting member is pivotally connected to the housing and connected to the linkage member, and moving of the operating part in respect to the housing links the pivoting member to pivot, so that the pivoting member pulls the linkage member.

Preferably, the operating part includes a chute, moving of the operating part brings the chute to move, and when the chute contacts the pivoting member, the pivoting member is driven to pivot.

Preferably, the unlock operating member further includes a second elastic resetting member, the second elastic resetting member is placed in the receiving cavity and abuts between the operating part and the housing, and the second elastic resetting member always tends to drive operating part.

Compared with the related art, in the frame folding mechanisms of the disclosure, the first ends of the upper supporting rods are respectively pivotally connected to both ends of the upper link, the first ends of the lower supporting rods are respectively pivotally connected to both ends of the lower link, the top ends of the foot frames are pivotally connected to second ends of the upper supporting rods, the bottom ends of the foot frames are pivotally connected to second ends of the lower supporting rods, so, when the foot frames are close to each other under force, the first ends of the upper supporting rods are pivoted in respect to the upper link, and the second ends of the upper supporting rods are pivoted in respect to the top ends of the foot frames, the first ends of the lower supporting rods are pivoted in response to the lower link and the second ends of the lower supporting rods are pivoted in response to the bottom ends of the foot frames, meanwhile, the upper link, the lower link and the middle upright rod simultaneously perform a upward motion under the pivoting of the upper supporting rods and the lower supporting rods, such that the foldable frame may be switched from the extended position to the folded position; on the contrary, when the foot frames are moved away from each other under force, the upper link, the lower link and the middle upright rod simultaneously perform a movement in the vertical direction under the pivoting of the upper supporting rods and the lower supporting rods, such that the foldable frame may be switched from the extended position to the folded position. Therefore, the frame folding mechanism of the disclosure has the advantages of being foldable, convenient to carry, and reducing the occupied space. Of course, the frame of double-person baby carriage with such frame folding mechanism also has the advantages of being foldable, convenient to carry, and reducing the occupied space.

DETAILED DESCRIPTION OF THE PREFERRED EMBODIMENTS

Figure 1:
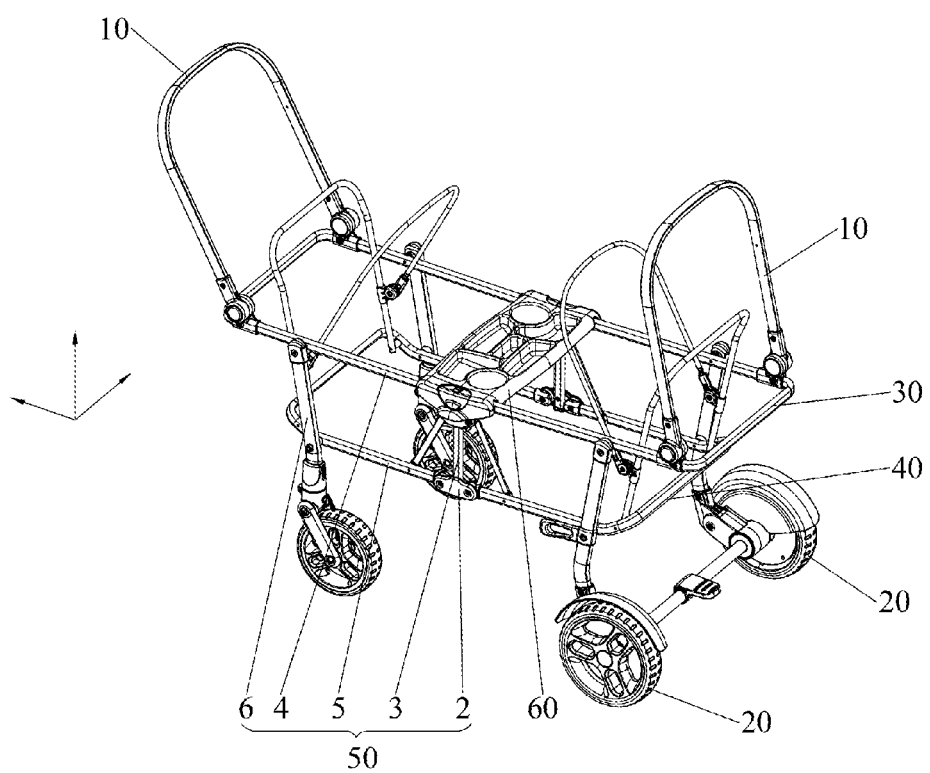
FIG. 1 is a perspective structural view of a frame of double-person baby carriage in an extended position according to a first embodiment of the disclosure.
Figure 2:
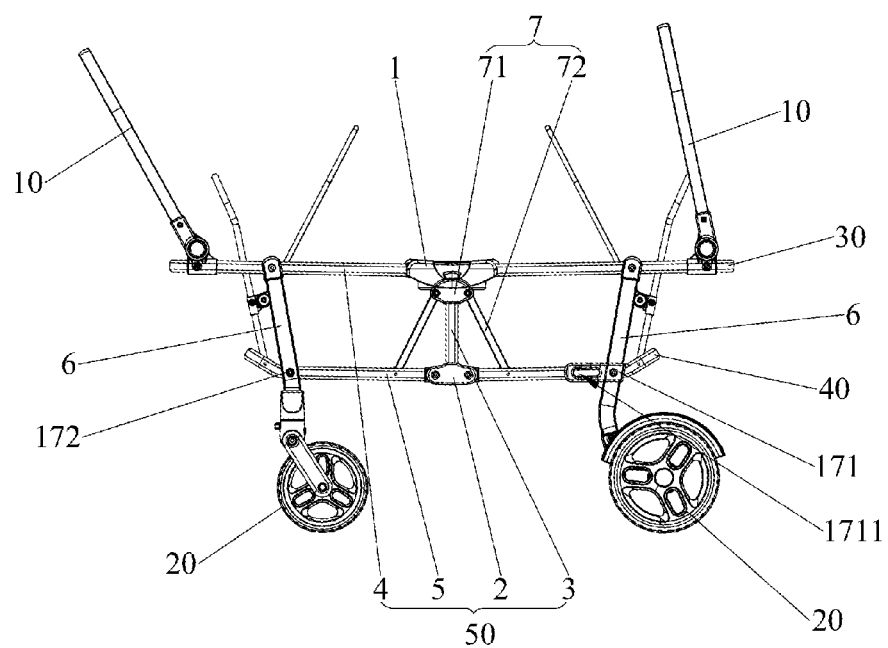
FIG. 2 is a front structural view of a frame of double-person baby carriage in an extended position according to a first embodiment of the disclosure.

In order to describe the technical content and structural features of the disclosure in detail, the following illustration is provided conjunction with the embodiments and the accompanying drawings.

Referring to FIGS. 1 to 4, a frame of double-person baby carriage 100a according to a first embodiment of the disclosure comprises a handle 10, wheels 20, a first connecting rod 30, a second connecting rod 40, a dining tray 60, and two frame folding mechanisms 50. The two frame folding mechanisms 50 are symmetrically arranged on the left and right sides respectively. There are two first connecting rods 30, and each of the first connecting rods 30 is connected between the two frame folding mechanisms 50. There are two second connecting rods 40, and each of the second connecting rods 40 is connected between the two frame folding mechanisms 50. The first connecting rods 30 and the second connecting rods 40 are parallel and spaced apart in a vertical direction. The dining tray 60 is connected between the two frame folding mechanisms 50.

Each of the frame folding mechanisms 50 of the disclosure comprises an extended position and a folded position, and each of the frame folding mechanisms 50 of the disclosure comprises an upper link 1, a lower link 2, a middle upright rod 3, two upper supporting rods 4, two lower supporting rods 5, and two foot frames 6. The upper link 1 and the lower link 2 are arranged in parallel in a horizontal direction and spaced apart in a vertical direction. The middle upright rod 3 is vertically connected between the upper link 1 and the lower link 2. The first ends of the two upper supporting rods 4 are respectively pivotally connected to both ends of the upper link 1. The first ends of the two lower supporting rods 5 are respectively pivotally connected to both ends of the lower link 2. The foot frames 6 are arranged in a vertical direction. Top ends of the foot frames 6 are pivotally connected to second ends of the upper supporting rods 4, and bottom ends of the foot frames 6 are pivotally connected to second ends of the lower supporting rods 5. Specifically, each of the bottoms of the foot frames 6 is connected to a wheel 20, so as to facilitate people to move the two foot frames 6 in a direction close to each other, thereby folding the frame of double-person baby carriage 100a of the disclosure. Preferably, a synchronization shaft 201 is inserted between the two wheel 20 oppositely arranged on two sides, such that the two opposite frame folding mechanisms 50 may be extended or folded synchronously, and at the same time, force for folding may be further saved. Each of the first connecting rods 30 is connected between the two upper supporting rods 4, and each of the second connecting rods 40 is connected between two lower supporting rods 5, such that the two frame folding mechanisms 50 may move synchronously. In this embodiment, the handle 10 is pivotally connected to the first connecting rods 30, such that the handle 10 may pivot to a position parallel to the first connecting rods 30 to facilitates subsequent folding of the frame, alternatively, the handle 10 may be folded after the frame folding mechanisms 50 is folded. Of course, in other embodiments, the handle 10 may be pivotally connected to the upper supporting rods 4, and the effect is the same, so the disclosure is not limited to this. The dining tray 60 is arranged between the two upper link 1. In this way, a dining area may be provided for baby by the dining tray 60. Preferably, the dining tray is clamped between the two upper links when the frame folding mechanisms is in the folded position, so it is not necessary to disassemble the dining tray when the frame is folded otherwise, thereby facilitating next deployment and improving efficiency.

When the two foot frames 6 are close to or far away from each other, the first ends of the upper supporting rods 4 are pivoted in respect to the upper link 1 and the second ends of the upper supporting rods 4 are pivoted in respect to the top ends of the foot frames 6, and the first ends of the lower supporting rods 5 are pivoted in respect to the lower link 2 and the second ends of the lower supporting rods 5 are pivoted in respect to the bottom ends of the foot frames 6, at the same time, the upper link 1, the lower link 2 and the middle upright rod 3 move in a vertical direction during pivoting of the upper supporting rods 4 and the lower supporting rods 5, so that the frame folding mechanisms 50 may be switched between an extended position and a folded position. For example, when the frame of double-person baby carriage 100 of the disclosure is folded, the upper link 1, the lower link 2 and the middle upright rod 3 move upwardly during pivoting of the upper supporting rods 4 and the lower supporting rods 5; moreover, when the frame of double-person baby carriage 100 of the disclosure is extended, the upper link 1, the lower link 2 and the middle upright rod 3 move downwardly during pivoting of the upper supporting rods 4 and lower supporting rods 5.

Referring to FIGS. 5 to 8, the frame folding mechanisms 50 of the disclosure further comprises a first positioning member 7. The first positioning member 7 selectively resists below the upper link 1. By the first positioning member 7, the frame folding mechanisms 50 may be stabilized at the extended position when it is in this position, so as to prevent the frame from shaking during pushing process. Specifically, the first positioning member 7 includes a slider 71 and two linkage rods 72. The slider 71 is slidably disposed on the middle upright rod 3. One end of the two linkage rods 72 are pivotally connected to the slider 71, and the other end of the two linkage rods 72 are pivotally connected to the lower supporting rods 5. Preferably, the slider 71 has a locating position in respect to the middle upright rod 3, and when the slider 71 is located at the locating position, the slider 71 resists below the upper link. It would be appreciated, when the slider 71 is in the locating position, the frame folding mechanisms 50 is in the extended position at the same time. When the slider 71 moves away from the locating position, the slider 71 descends, and which brings the linkage rods 72 to pivot. It would be appreciated, when the slider 71 moves away from the locating position, the frame folding mechanisms 50 is in the process of folding or the folding position at the same time. More specifically, a pivot point of the linkage rods 72 and the slider 71 (hereinafter referred to as a first pivot point K), a pivot point of the linkage rods 72 and the lower supporting rods 5 (hereinafter referred to as a second pivot point M) and a pivot point of the lower supporting rods 5 and the lower link 2 (hereinafter referred to as a third pivot point N) together constitute three points of a triangle. When the slider 71 is in the locating position, the triangle formed by the first pivot point K, the second pivot point M an the third pivot point N has a stabilizing effect, such that the structure of the first positioning member 7 is more stable and reliable, thereby facilitating the frame folding mechanisms 50 to be more stable and reliable when it is in the extended position. More specifically, the second pivot point M is located between the third pivot point N and the pivot point L of the lower supporting rods 5 and the foot frames 6.

Referring to FIGS. 7 to 10, when the slider 71 is in the locating position, the slider 71 is also locked and connected to the upper link 1, such that the slider 71 is locked to the locating position, which is more beneficial for the stability of the frame folding mechanisms 50. By locking between the slider 71 and the upper link 1, the slider 71 may be more stably located at the locating position. The frame folding mechanisms 50 of the disclosure may further comprise an unlocking member 8. The unlocking member 8 is movably disposed on the upper link 1. For example, the unlocking member 8 is slidably disposed on the upper link 1, Of course, in other embodiments, the unlocking member 8 may be rotatable, so the disclosure is not limited this. The unlocking member 8 may be switched between a locked position and an unlocked position. It would be appreciated, when the unlocking member 8 is in the locked position, the slider 71 is locked to the upper link 1, and at this time, the slider 71 is fixed to the locating position. When the unlocking member 8 is in the unlocked position, the slider 71 is unlocked from the upper link 1, and the slider 71 may slide along the middle upright rod 3, while the frame folding mechanisms 50 are in a foldable or collapsible state. Specifically, the unlocking member 8 includes a lock part 81, and the slider 71 includes a sub-lock part 711. The lock part 81 is selectively engaged with the sub-lock part 711, so as to lock the slider 71 and the upper link 1. For example, the sub-lock part 711 has a concave structure, and the lock part 81 has a convex structure, moreover, the convex structure may selectively extend into the concave structure to lock the slider 71 and the unlocking member 8. Of course, in other embodiments, the lock part 81 may have a concave structure, and the sub-lock part 711 may have a convex structure, and the disclosure if not defined limited thereto. In this embodiment, there are two sub-lock parts 711 and two lock parts 81. The slider 71 has a convex structure and a concave structure which are alternately arranged in the up and down direction, and the unlocking member 8 also has a convex structure and a concave structure which are alternately arranged in the up and down direction. When the unlocking member 8 slides to the locked position, the convex structure of the slider 71 extends into the concave structure of the unlocking member 8, and the convex structure of the unlocking member 8 extends into the concave structure of the slider 71 too, such that locking between the slider 71 and the unlocking member 8 is strengthened. Preferably, each of the lock parts 81 has a first inclined surface 811, and each of the sub-lock parts 711 has a second inclined surface 7111 cooperating with the first inclined surface 811. By cooperation of the first inclined surface 811 and the second inclined surface 7111, the lock parts 81 and the sub-lock parts 711 may be locked more quickly and more accurately.

Figure 9:
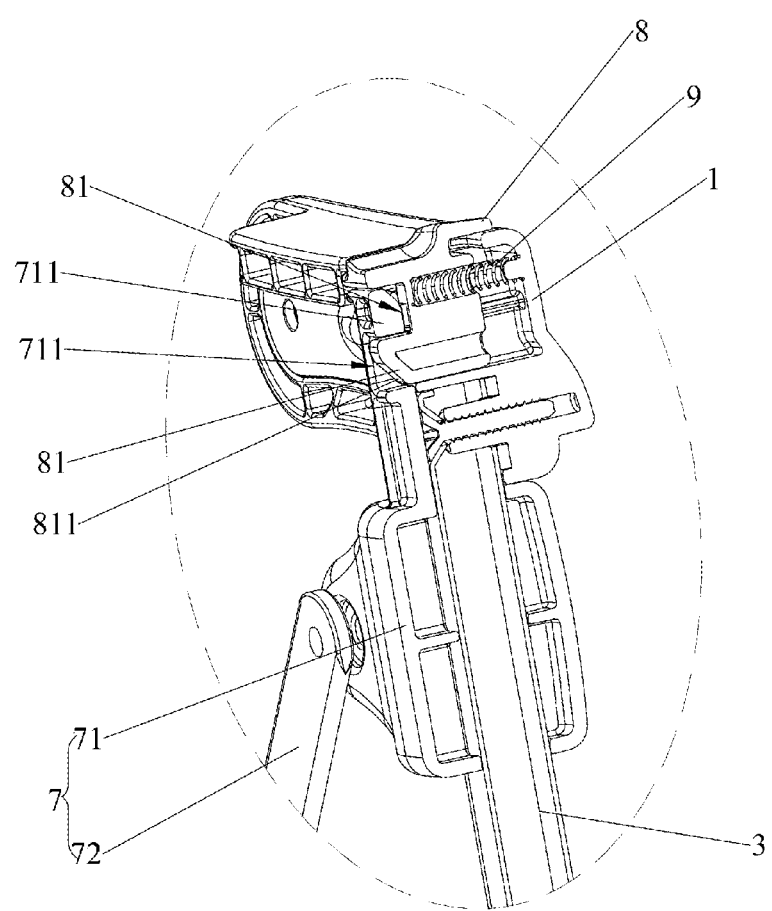
FIG. 9 is a sectional perspective view of FIG. 7.
Figure 10:
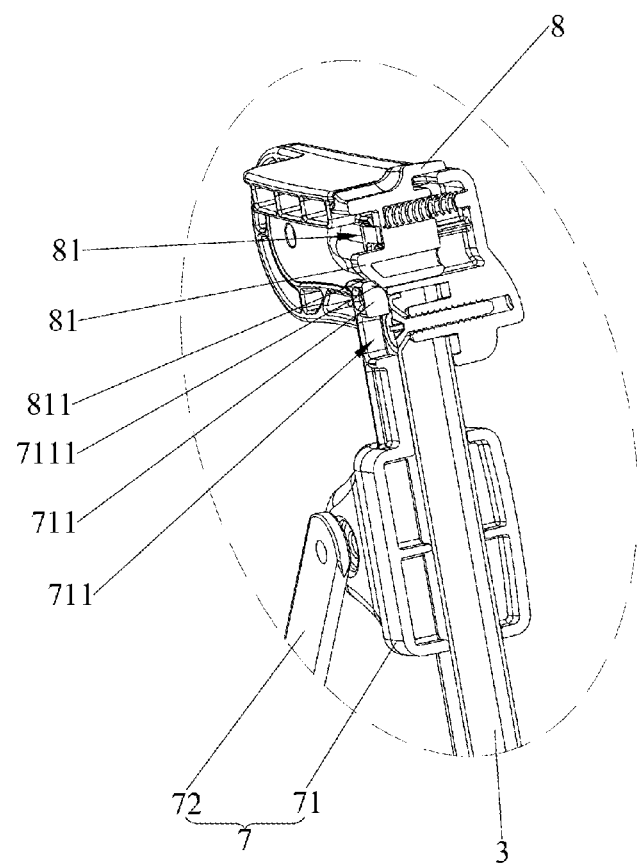
FIG. 10 is a sectional perspective view of FIG. 8.

Referring to FIGS. 9 and 10, each of the frame folding mechanisms 50 of the disclosure further comprises an elastic member 9. The elastic member 9 is located between the unlocking member 8 and the upper link 1. The elastic member 9 always tends to drive the unlocking member 8 to slide to the locked position. For example, the elastic member 9 may be a spring. When the user pushes the unlocking member 8 to the unlocked position, the spring at this time is compressed and has elastic potential energy. When the user releases the unlocking member 8, the spring pushes the unlocking member 8 to slide to the locked position due to elastic recovery.

Referring to FIGS. 1 to 4, the frame folding mechanism 50 of the disclosure further comprises a second positioning member 17. The second positioning member 17 is fixedly connected to a tail end of the foot frames 6. When the frame folding mechanism 50 is in the folded position, the second positioning member 17 is coupled to the two foot frames 6 to fix the two foot frames 6 relatively, such that the frame of double-person baby carriage 100 of the disclosure may be positioned in the folded position without being affected by the outside. Specifically, the second positioning member 17 includes an engage block 171 and a convex post 172, one of the two foot frames 6 is provided with the engage block 171, and the other one of the two foot frames 6 is provided with the convex post 172. The engage block 171 is provided with an elongated hole 1711, and the convex post 172 is clamped in the elongated hole 1711.

Figure 11:
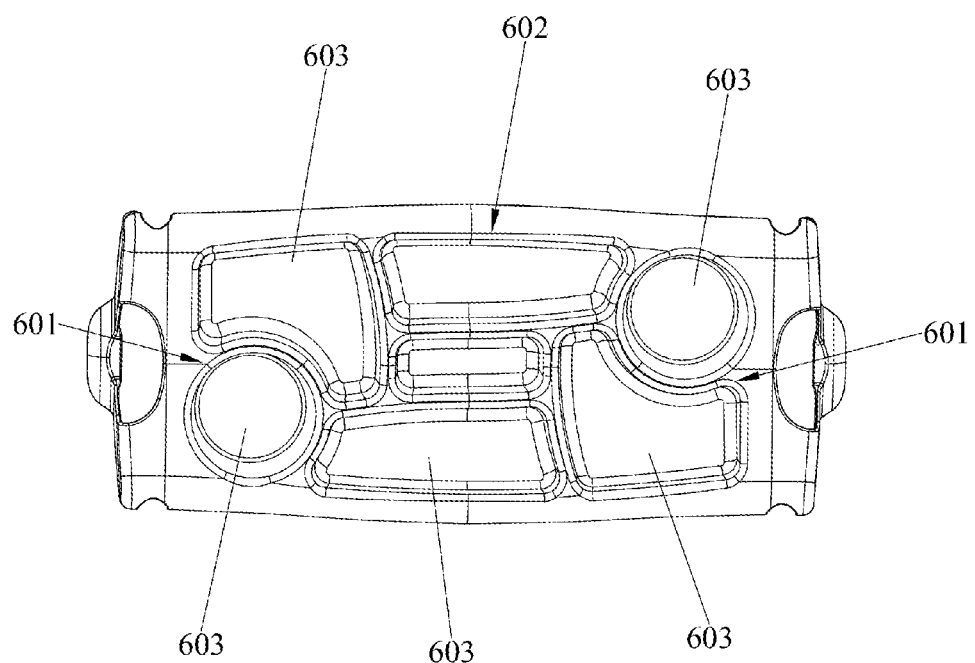
FIG. 11 is a top structural view of a dining tray of a frame of double-person baby carriage according to a first embodiment of the disclosure.

Referring to FIG. 11, the dining tray 60 includes two single dining areas 601 and a common dining area 602. The common dining area 602 is located between the two single dining areas 601. Both the single dining areas 601 and the common dining area 602 include concave structures 603 with upward openings.

Figure 12:
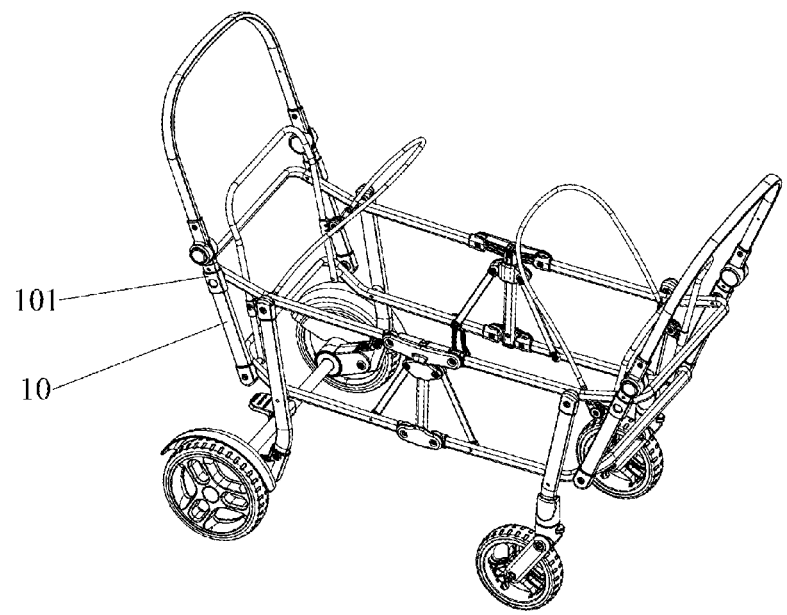
FIG. 12 is a perspective structural view of a frame of double-person baby carriage in an extended position according to a second embodiment of the disclosure.
Figure 13:
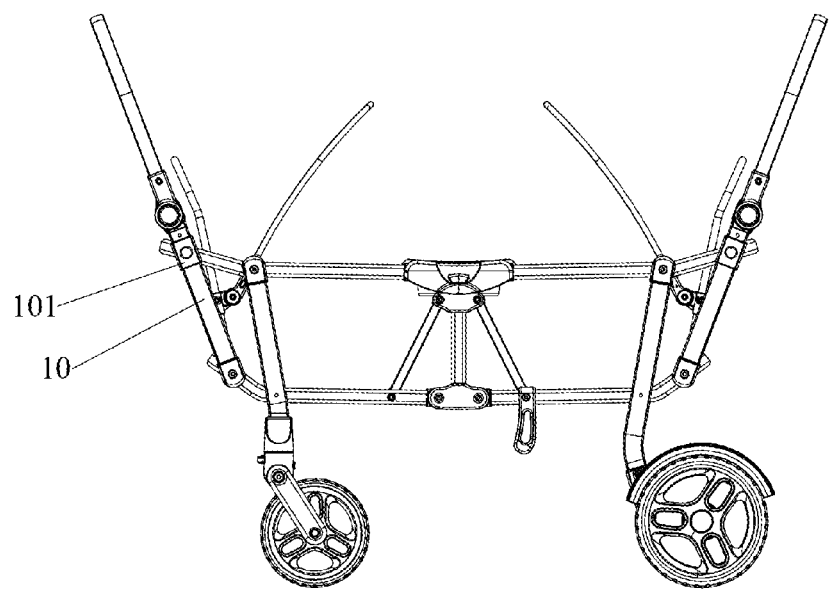
FIG. 13 is a front structural view of a frame of double-person baby carriage in an extended position according to a second embodiment of the disclosure.
Figure 14:
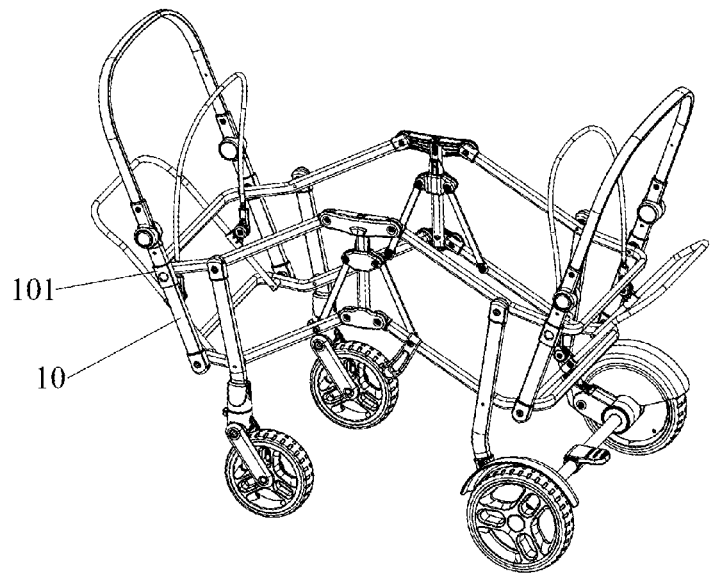
FIG. 14 is a perspective structural view of a frame of double-person baby carriage in a folding process according to a second embodiment of the disclosure.
Figure 15:
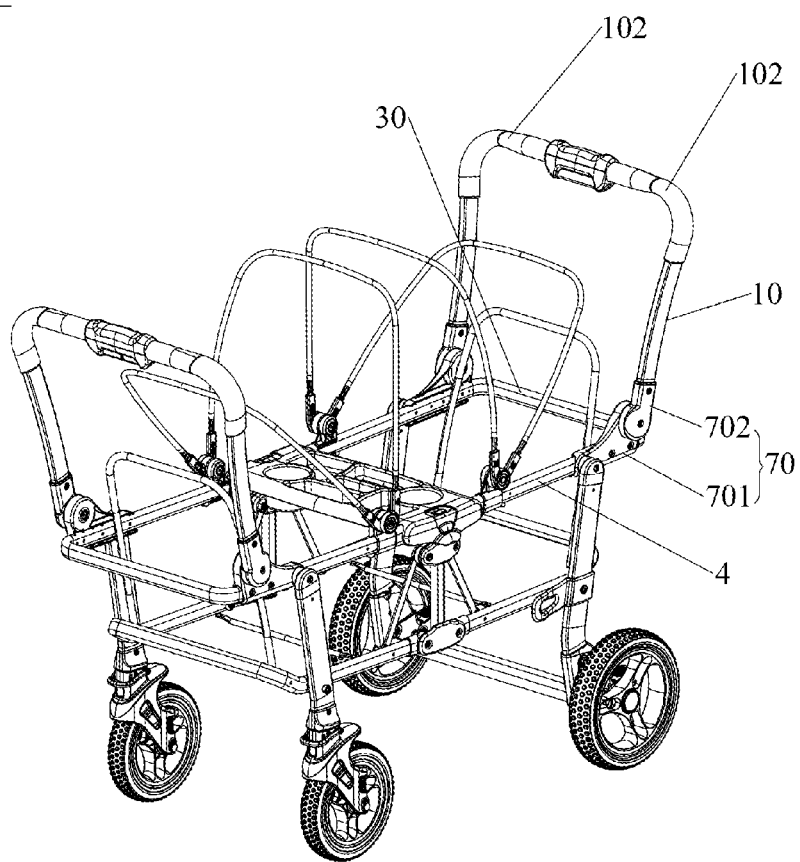
FIG. 15 is a perspective structural view of a frame of double-person baby carriage in an extended position according to a third embodiment of the disclosure.

Referring to FIGS. 12 to 14, a frame of double-person baby carriage 100b according to the second embodiment of the disclosure is illustrated. The frame of double-person baby carriage 100b of the second embodiment is basically as same as the frame of double-person baby carriage 100a of the first embodiment in structure, except a different handle 10. In this embodiment, a head end of the handle 10 extends to the lower supporting rods 5, and a tail end of the handle 10 is pivotally connected to the second connecting rods 40. Moreover, the handle 10 is further covered by a sliding sleeve 101, i.e., the sliding sleeve 101 is slidably disposed on the handle 10, and further, the sliding sleeve 101 is pivotally connected to the first connecting rods 30. Of course, in other embodiments, the tail end of the handle 10 may be pivotally connected to the lower supporting rods 5, and the sliding sleeve 101 may be pivotally connected to the upper supporting rods 4, so the disclosure is not limited to this. When the frame of double-person baby carriage of the disclosure is extended or folded, during pivoting of the handle 10, the sliding sleeve 101 slides up and down along the handle 10. In the frame of double-person baby carriage 100a of the first embodiment, the tail end of the handle 10 is connected to the upper supporting rods 4 or the first connecting rods 30.

The rest of the structure of the frame of double-person baby carriage 100b of the second embodiment is the same as that of the frame of double-person baby carriage 100a of the first embodiment, so it will not be redundantly illustrated here.

Referring to FIGS. 15 to 20, a frame of double-person baby carriage 100c according to the third embodiment of the disclosure is illustrated. The frame of double-person baby carriage 100c of the third embodiment is basically as same as the frame of double-person baby carriage 100a of the first embodiment in structure, except:

(1) The handle 10 of the frame of double-person baby carriage 100c of the third embodiment includes a holding tube 102, and a cross-sectional shape of the holding tube 102 gradually changes from a circle to an ellipse in the direction from the inside to the outside, thereby making the holding tube 102 conforms to ergonomics, and improving the comfort of the user's holding or grip.

(2) The frame of double-person baby carriage of the third embodiment further comprises a handle adjustment mechanism 70 for locking or unlocking the position of the handle 10. When the handle adjustment mechanism 70 unlocks the handle 10, the handle 10 may pivot in respect to the upper supporting rods 4 or the first connecting rods 30; and when the handle adjustment mechanism 70 locks the handle 10, the handle 10 is fixed in respect to the upper supporting rods 4 or the first connecting rods 30.

The handle adjustment mechanism 70 includes a first joint 701, a second joint 702, a driving member 703, an unlock operating member 704 and a linkage member (not shown). The first joint 701 is pivotally connected to the second joint 702 by a pivot (not shown), and the second joint 702 may also move axially in respect to the first joint 701 to lock or unlock the first joint 701. The driving member 703 is sleeved on the pivot and located between the first joint 701 and the second joint 702. The driving member 703 may rotate in respect to the pivot, and rotating of the driving member 703 links the second joint 702 to move in respect to the first joint 701, so as to lock or unlock the first joint 701. The first joint 701 is fixedly connected to both the upper supporting rods 4 and the first connecting rods 30, and the second joint 702 is fixedly connected to the handle 10. Of course, in other embodiments, the first joint 701 is connected to the upper supporting rods 4; or alternatively, the first joint 701 is connected to the first connecting rods 30, so the disclosure is not limited to this. For example, when the first joint 701 and the second joint 702 are unlocked, i.e., the second joint 702 may pivot in respect to the first joint 701, that is, the handle 10 may pivot in respect to the upper supporting rods 4 and the first connecting rods 30, so as to adjust an angle of the handle 10 in respect to the upper supporting rods 4 and the first connecting rods 30; and when the first joint 701 and the second joint 702 are locked, i.e., the handle 10 is fixed in respect to the upper supporting rods 4 and the first connecting rods 30, so that the adjusted angle of the handle 10 can be fixed.

Continuously referring to FIGS. 15 to 20, the unlock operating member 704 is disposed on the handle 10, one end of the linkage member is connected to the unlock operating member 704, and the other end of the linkage member is connected to the driving member 703. By operating of the unlock operating member 704, the operating member 704 is unlocked and the linkage member is linked to move, and in turn, by the linked linkage member, the driving member 703 is linked to perform a rotation motion around the pivot, such that the second joint 702 is axially moved in respect to the first joint 701 to unlock. For example, the linkage member may be a steel rope, but the disclosure is not limited to this.

Figure 16:
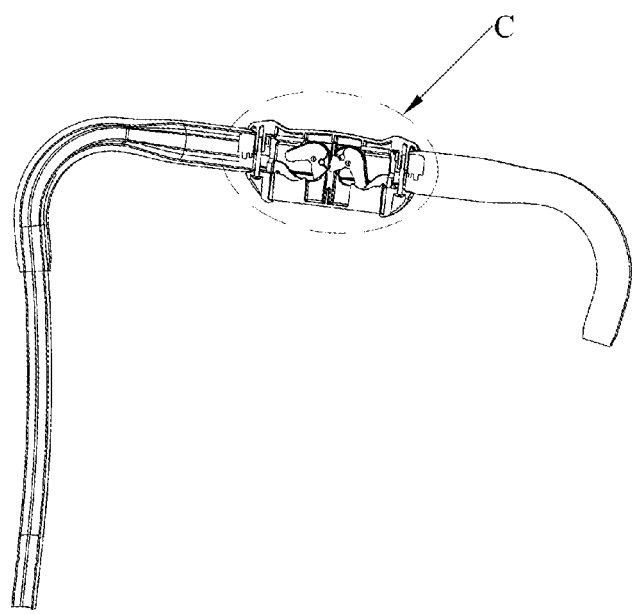
FIG. 16 is a sectional perspective view of a handle of a frame of double-person baby carriage according to a third embodiment of the disclosure.
Figure 17:
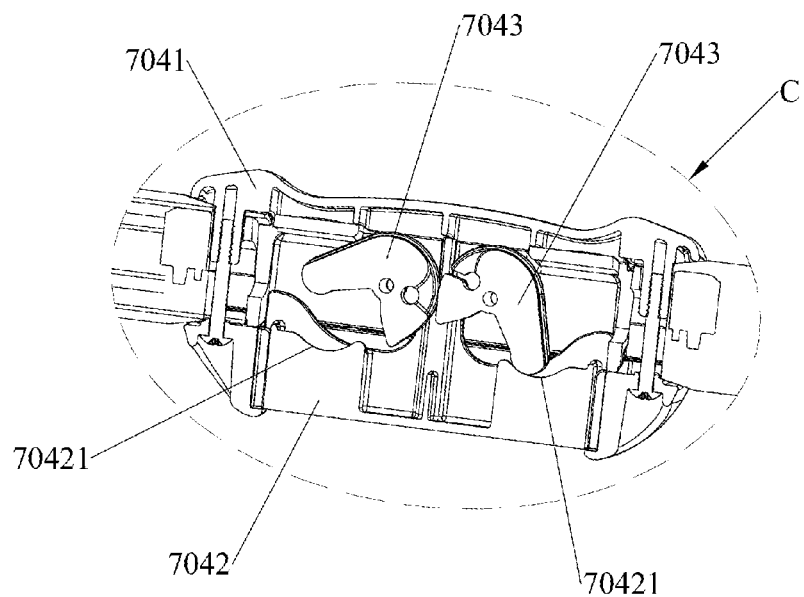
FIG. 17 is an enlarged schematic view of the part C in FIG. 16.
Figure 18:
FIG. 18 is a perspective structural view of a frame of double-person baby carriage with a second joint hidden according to a third embodiment of the disclosure.

Referring to FIGS. 16 to 17, the unlock operating member 704 includes a housing 7041 sleeved on the handle 10, an operating part 7042 movable in respect to the housing 7041 and a pivoting member 7043. It would be appreciated, the operating part 7042 may perform a telescopic motion in respect to the housing 7041, and the user can press the operating part 7042 to unlock the handle 10. The housing 7041 has a receiving cavity, and the pivoting member 7043 is located in the receiving cavity. The pivoting member 7043 is pivotally connected to the housing 7041 and connected to the linkage member. The operating part 7042 may move in respect to the housing 7041, so as to link the pivoting member 7043 to pivot, such that the pivoting member 7043 pulls the linkage member. Specifically, the operating part 7042 includes a chute 70421. Moving of the operating part 7042 may bring the chute 70421 to move, and when the chute 70421 contacts the pivoting member 7043, the pivoting member 7043 is driven to pivot. Preferably, the unlock operating member 704 further includes a first elastic resetting member (not shown). The first elastic resetting member is placed in the receiving cavity and abuts between the operating part 7042 and the housing 7041. The first elastic resetting member always tends to drive operating part 7042 to reset. By the first elastic resetting member, when the user releases the operating part 7042, the operating part 7042 is reset under the action of the first elastic resetting member to facilitate the next pressing.

Figure 19:
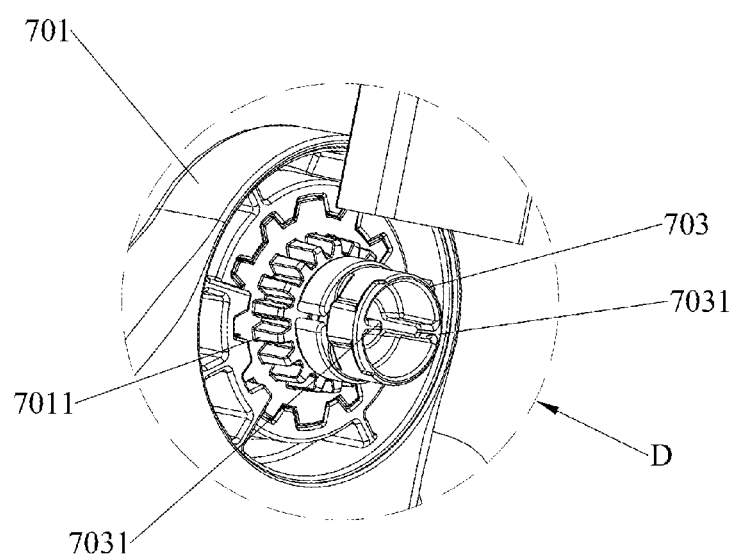
FIG. 19 is an enlarged schematic view of the part D in FIG. 18.
Figure 20:
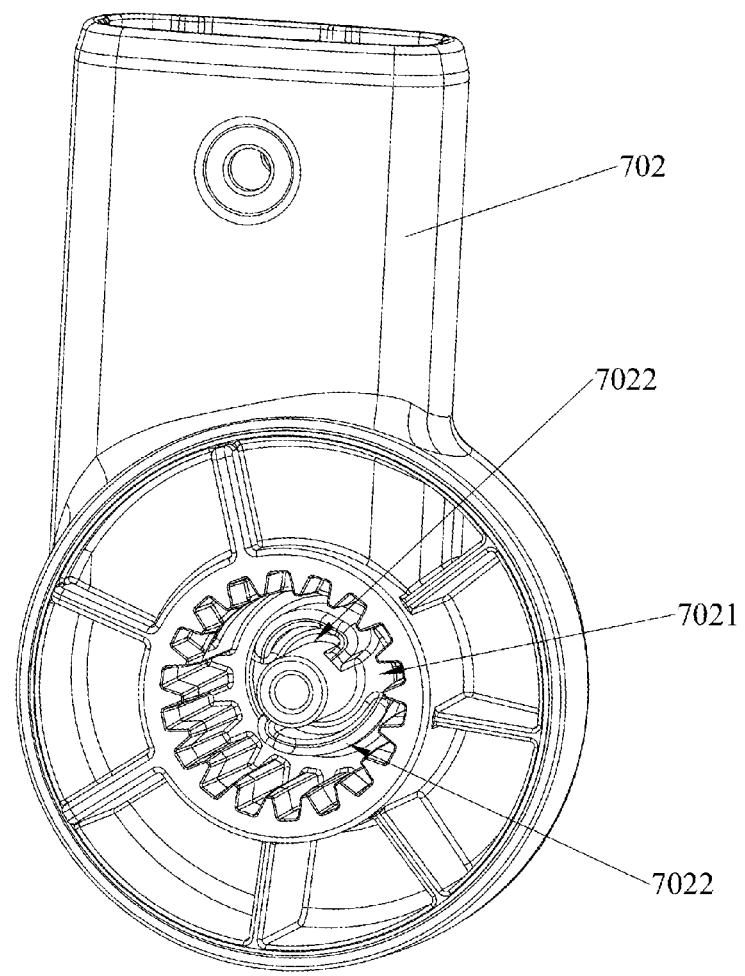
FIG. 20 is a sectional perspective view of a second joint of a frame of double-person baby carriage according to a third embodiment of the disclosure.

Referring to FIGS. 19 to 20, the first joint 701 has a locking part 7011, and the second joint 702 has a sub-locking part 7021 that is engaged with the locking part 7011. By cooperative locking of the locking part 7011 and the sub-locking part 7021, locking or unlocking between the first joint 701 and the second joint 702 may be performed. For example, the locking part 7011 may be a gear, and the sub-locking part 7021 may be a gear groove, the second joint 702 moves in the axial direction to cause sub-locking part 7021 engages or disengages with the locking part 7011, such that the first joint 701 and the second joint 702 are locked or unlocked. Of course, in other embodiments, the first joint 701 may have the sub-locking part 7021, and the second joint 702 may have the locking part 7011, so the disclosure is limited to this.

Continuously referring to FIGS. 19 to 20, the rotation of the driving member 703 pushes the second joint 702 away from the first joint 701 to unlock. Specifically, the driving member 703 includes a protruding part 7031, and the second joint 702 includes a long driving groove 7022 that cooperates with the protruding part 7031. The rotation of the driving member 703 causes the protruding part 7031 to push the long driving groove 7022 for pushing the second joint 702. More specifically, the driving member 703 has a hollow columnar structure, and the protruding part 7031 is formed by an inner wall of the columnar structure extending inward, moreover, a bottom of the long driving groove 7022 is gradually inclined inward along the rotation direction of the protruding part 7031, so when the protruding part 7031 of the driving member 703 rotates with the driving member 703, the protruding part 7031 slides along the long driving groove 7022, so as to push the long driving groove 7022, thereby pushing the second joint 702.

Continuously referring to FIGS. 19 to 20, the handle adjustment mechanism 70 further includes a second elastic resetting member (not shown). The second elastic resetting member is disposed between the second joint 702 and the driving member 703, and the second elastic resetting member always tends to drive the second joint 702 and the first joint 701 to lock. For example, the second elastic resetting member may be a torsion spring, but the disclosure is not limited to this.

It would be noted that in the disclosure, the front-rear direction refers to the direction opposite to the two handle 10, which is equivalent to the forward and backward direction of the frame of double-person baby carriage 100; moreover, the left-right direction refers to a direction perpendicular to the front-rear direction.

Figure 3:
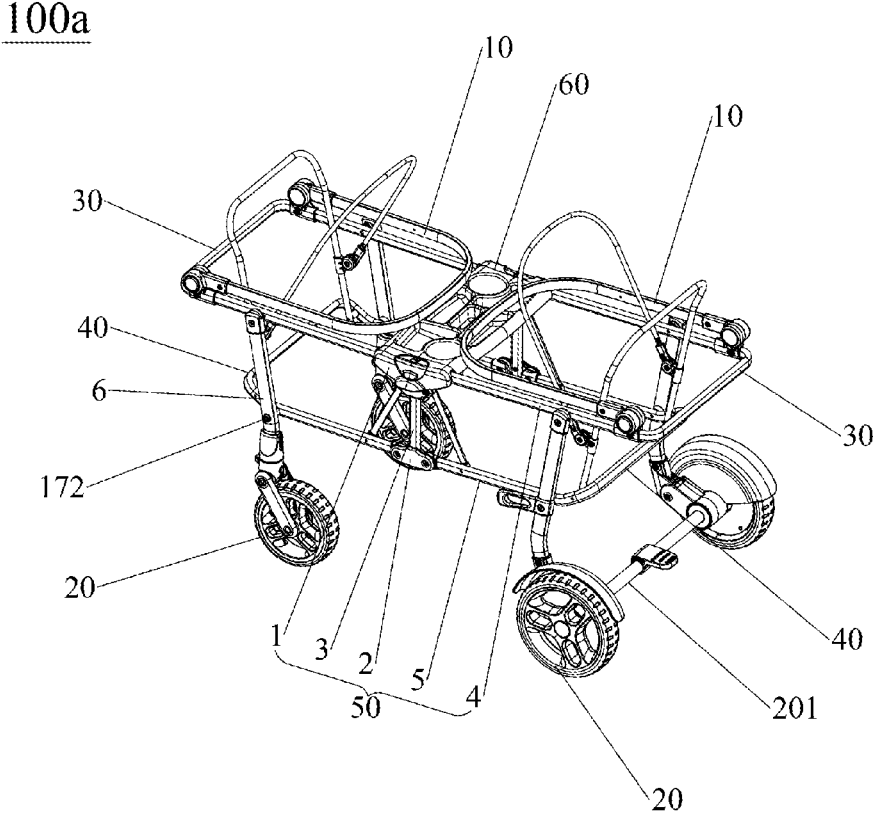
FIG. 3 is a perspective structural view of a frame of double-person baby carriage in an extended position with a folded handle according to a first embodiment of the disclosure.
Figure 4:
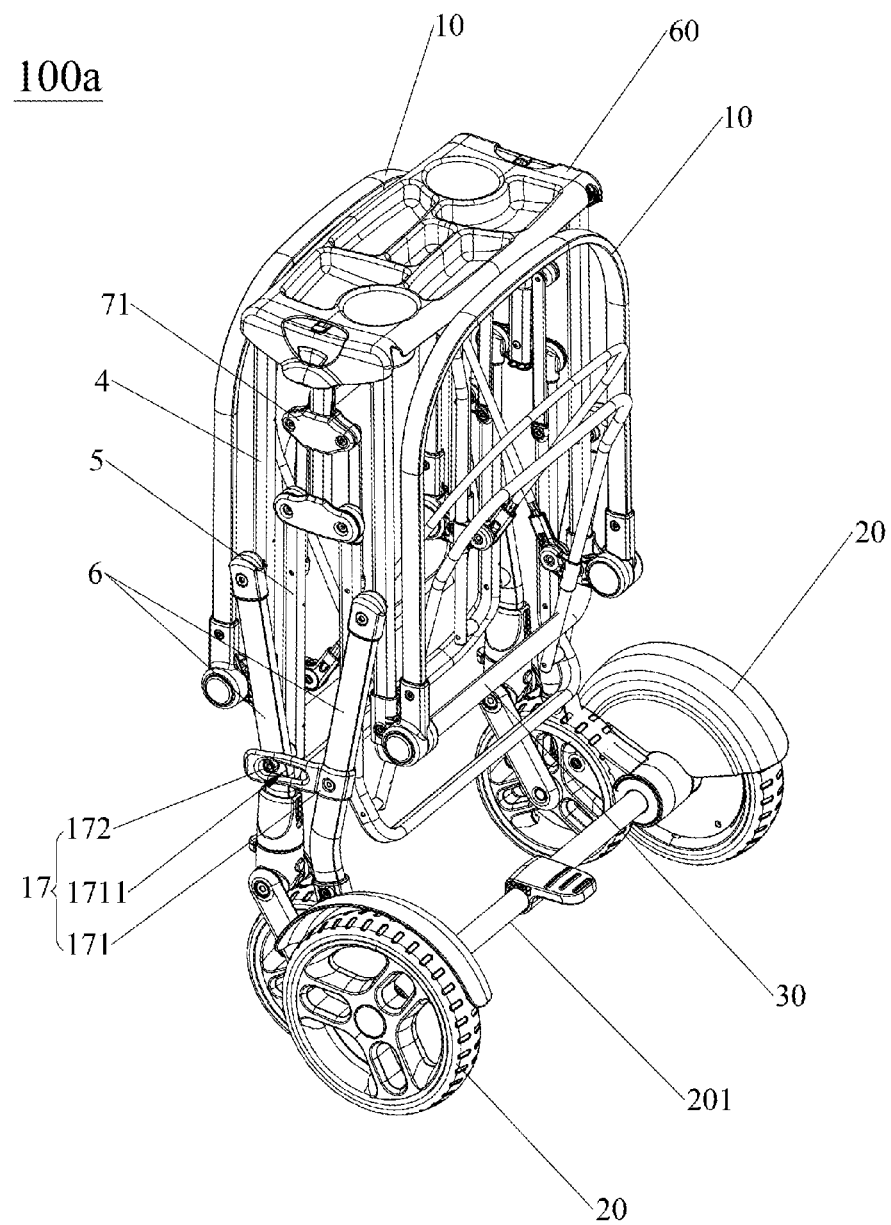
FIG. 4 is a perspective structural view of a frame of double-person baby carriage in a folded position according to a first embodiment of the disclosure.
Figure 5:
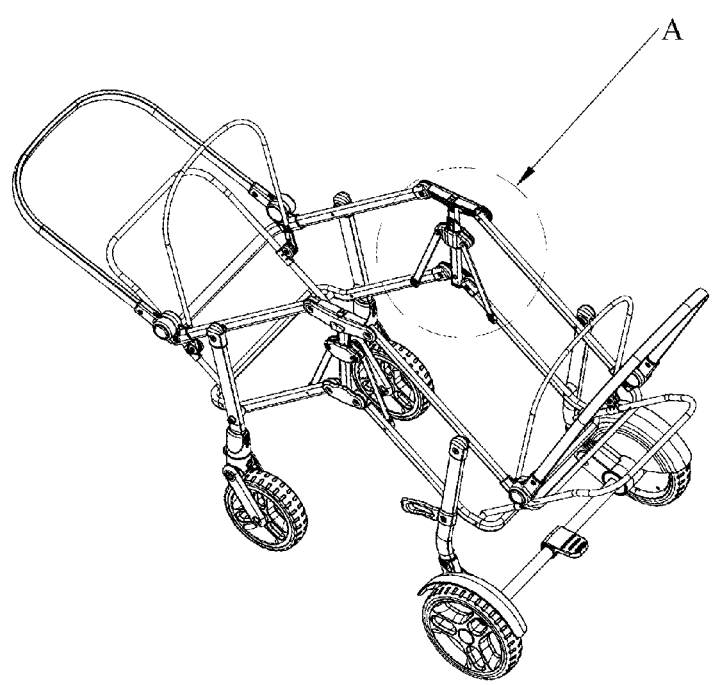
FIG. 5 is a perspective structural view of a frame of double-person baby carriage in a folding process according to a first embodiment of the disclosure.
Figure 6:
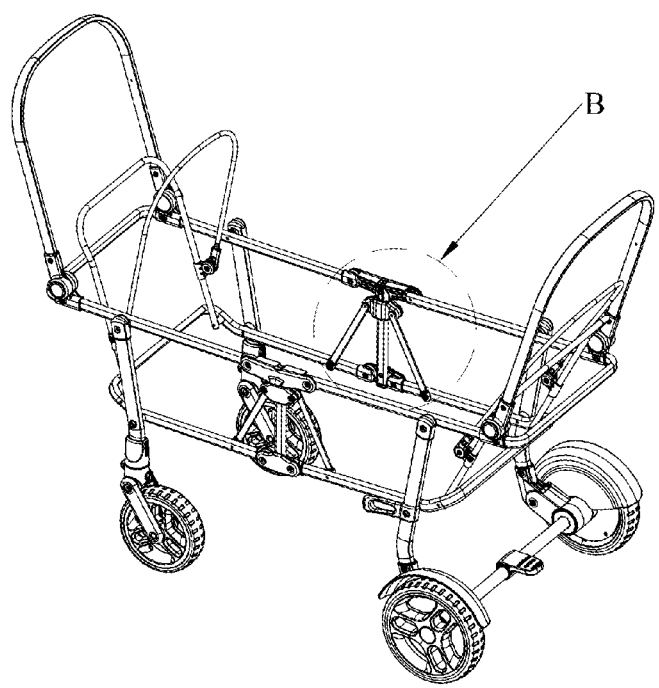
FIG. 6 is a perspective structural view of a frame of double-person baby carriage in an extended position with a dining tray removed according to a first embodiment of the disclosure.
Figure 7:
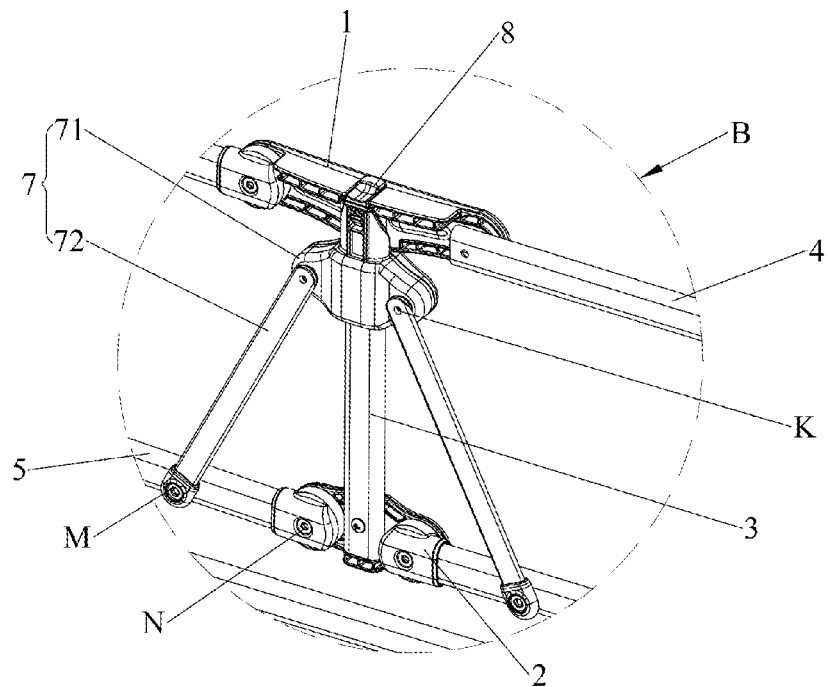
FIG. 7 is a partial schematic of the part B in FIG. 6.
Figure 8:
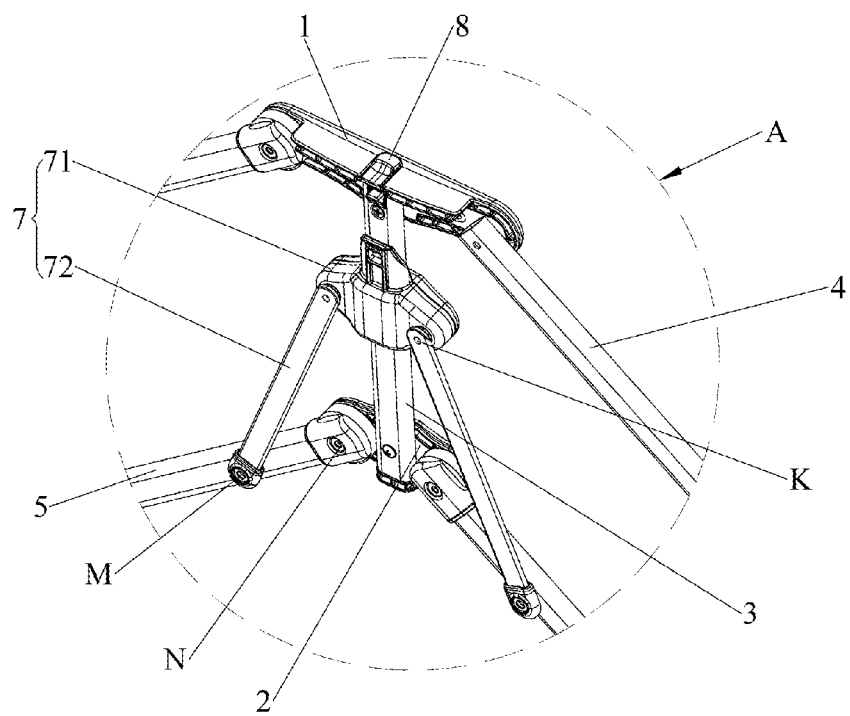
FIG. 8 is a partial schematic of the part A in FIG. 5.

With reference to the accompanying drawings, the working principle of the frame folding mechanisms 50 of the disclosure will be described as follows: when the frame of double-person baby carriage 100 is switched from the extended position to the folded position, the handle 10 is firstly pivoted in respect to the upper supporting rods 4 to fit the position of the upper supporting rods 4, as shown in FIG. 3, and then the unlocking member 8 is operated to cause the unlocking member 8 to slide to the unlocked position; next, wheels 20 are pushed to cause the wheels 20 to close each other in the front-to-rear direction, such that the first ends of the upper supporting rods 4 are pivoted in respect to the upper link 1, and the second ends of the upper supporting rods 4 are pivoted in respect to the foot frames 6, while the first ends of the lower supporting rods 5 are pivoted in respect to the lower link 2, and the second ends of the lower supporting rods 5 are pivoted in respect to the foot frames 6, so that the upper link 1, the middle upright rod 3 and lower link 2 all rise together, and the upper supporting rods 4 and the lower supporting rods 5 are pivoted form the horizontal position to the vertical position or close to the vertical position. At this time, the engage block 171 of one of the foot frames 6 may engage the convex post 172 on the other one of the foot frames 6, such that the frame is positioned to the folded position. Similarly, when the frame of double-person baby carriage 100 is switched from the folded position to the extended position, the lock between the two foot frames 6 is realized at first, and then the two wheel 20 are moved away from each other, and the upper supporting rods 4 and the lower supporting rods 5 are pivoted to a horizontal position, the upper link 1, the middle upright rod 3 and the lower link 2 descend together, and the slider 71 of the first positioning member 7 resists below the upper link 1.

Compared with the related art, in the frame folding mechanisms 50 of the disclosure, the first ends of the upper supporting rods 4 are respectively pivotally connected to both ends of the upper link 1, the first ends of the lower supporting rods 5 are respectively pivotally connected to both ends of the lower link 2, the top ends of the foot frames 6 are pivotally connected to the second ends of the upper supporting rods 4, and the bottom ends of the foot frames 6 are pivotally connected to the second ends of the lower supporting rods 5, so, when the foot frames 6 are close to each other under force, the first ends of the upper supporting rods 4 are pivoted in respect to the upper link 1, and the second ends of the upper supporting rods 4 are pivoted in respect to the top ends of the foot frames 6, the first ends of the lower supporting rods 5 are pivoted in respect to the lower link 2, and the second ends of the lower supporting rods 5 are pivoted in respect to the bottom ends of the foot frames 6, meanwhile, the upper link 1, the lower link 2 and the middle upright rod 3 simultaneously perform a upward motion under the pivoting of the upper supporting rods 4 and the lower supporting rods 5, such that the foldable frame may be switched from the extended position to the folded position; on the contrary, when the foot frames 6 are moved away from each other under force, the upper link 1, the lower link 2 and the middle upright rod 3 simultaneously perform a movement in the vertical direction under the pivoting of the upper supporting rods 4 and the lower supporting rods 5, such that the foldable frame may be switched from the extended position to the folded position. Accordingly, the frame folding mechanisms 50 of the disclosure has the advantages of being foldable, convenient to carry, and reducing the occupied space. Of course, the frame of double-person baby carriage 100 with the frame folding mechanisms 50 has the advantages of being foldable, convenient to carry, and reducing the occupied space.

What disclosed above are only preferred embodiments of the disclosure, and the scope of the disclosure certainly cannot be limited by this. Therefore, any equivalent changes made according to the scope of the disclosure still belong to the disclosure.

What is claimed is:

1. A frame folding mechanism comprising an extended position and a folded position, wherein the frame folding mechanism further comprises:
   an upper link and a lower link, the upper link and the lower link are arranged in parallel in a horizontal direction and spaced apart in a vertical direction;
   a middle upright rod vertically connected between the upper link and the lower link;
   an upper supporting rod, a first end of the upper supporting rod being pivotally connected to the upper link;
   a lower supporting rod, a first end of the lower supporting rod being pivotally connected to the lower link;
   a foot frame arranged in a vertical direction, a top end of the foot frame being pivotally connected to a second end of the upper supporting rod, and a bottom end of the foot frame being pivotally connected to a second end of the lower supporting rod;
   a first positioning member which selectively resists below the upper link; and
   a second positioning member fixedly connected to one end of the foot frame
   wherein when the frame folding mechanism is in the folded position, the second positioning member is coupled to the foot frame so as to fix the foot frame relatively, and
   wherein the second positioning member includes an engage block and a convex post, a first foot frame is provided with the engage block, and a second foot frame is provided with the convex post, the engage block is provided with an elongated hole, and the convex post is clamped in the elongated hole.

2. The frame folding mechanism according to claim 1, wherein when the foot frame moves in a front-rear direction, the first end of the upper supporting rod is pivoted in respect to the upper link and the second end of the upper supporting rod is pivoted in respect to the top end of the foot frame, the first end of the lower supporting rod is pivoted in respect to the lower link and the second end of the lower supporting rod is pivoted in respect to the bottom end of the foot frame, and the upper link, the lower link, and the middle upright rod simultaneously move in a vertical direction during pivoting of the upper supporting rod and the lower supporting rod, so that the frame folding mechanism is switched between the extended position and the folded position.

3. The frame folding mechanism according to claim 1, wherein the first positioning member includes a slider and two linkage rods, the slider is slidably disposed on the middle upright rod, one end of the two linkage rods are pivotally connected to the slider, and the other end of the two linkage rods are pivotally connected to a first lower supporting rod and a second lower supporting rod, respectively.

4. The frame folding mechanism according to claim 3, wherein the slider has a locating position in respect to the middle upright rod, when the slider is located at the locating position, the slider resists below the upper link, and when the slider moves away from the locating position, vertical movement of the slider brings the linkage rods to pivot.

5. The frame folding mechanism according to claim 4, wherein when the slider is located at the locating position, the slider is further locked and connected to the upper link.

6. The frame folding mechanism according to claim 5, wherein the frame folding mechanism further comprises an unlocking member which is movably disposed on the upper link.

7. The frame folding mechanism according to claim 6, wherein the unlocking member includes a lock part, and the slider includes a sub-lock part, the lock part being selectively engaged with the sub-lock part.

8. The frame folding mechanism according to claim 6, wherein the unlocking member is slidably disposed on the upper link to be switched between a locked position and an unlocked position.

9. The frame folding mechanism according to claim 8, wherein the frame folding mechanism further comprises an elastic member which is located between the unlocking member and the upper link, the elastic member biases the unlocking member to slide to the locked position.

10. The frame folding mechanism according to claim 3, wherein a pivot point of the linkage rods and the slider, a pivot point of the linkage rods and the lower supporting rods, and a pivot point of the lower supporting rods and the lower link together constitute three points of a triangle.

11. The frame folding mechanism according to claim 3, wherein the pivot point of the linkage rods and the lower supporting rods is located between the pivot point of the lower supporting rods and the foot frame and the pivot point of the lower supporting rods and the lower link.

12. A frame folding mechanism comprising an extended position and a folded position, wherein the frame folding mechanism further comprises:
   an upper link and a lower link, the upper link and the lower link are arranged in parallel in a horizontal direction and spaced apart in a vertical direction;
   a middle upright rod vertically connected between the upper link and the lower link;
   an upper supporting rod, a first end of the upper supporting rod being pivotally connected to the upper link;
   a lower supporting rod, a first end of the lower supporting rod being pivotally connected to the lower link;
   a foot frame arranged in a vertical direction, a top end of the foot frame being pivotally connected to a second end of the upper supporting rod, and a bottom end of the foot frame being pivotally connected to a second end of the lower supporting rod; and
   a first positioning member which selectively resists below the upper link, the first positioning member includes a slider and two linkage rods, the slider is slidably disposed on the middle upright rod, one end of the two linkage rods are pivotally connected to the slider, and the other end of the two linkage rods are pivotally connected to the lower supporting rods,
   wherein the first positioning member includes a slider and two linkage rods, the slider is slidably disposed on the middle upright rod, one end of the two linkage rods are pivotally connected to the slider, and the other end of the two linkage rods are pivotally connected to a first lower supporting rod and a second lower supporting rod, respectively,
   wherein the slider has a locating position in respect to the middle upright rod, when the slider is located at the locating position, the slider resists below the upper link, and when the slider moves away from the locating position, vertical movement of the slider brings the linkage rods to pivot, and
   wherein when the slider is located at the locating position, the slider is further locked and connected to the upper link.

13. A frame of a double-person baby carriage comprising an extended position and a folded position, wherein the frame of the double-person baby carriage further comprises:
- an upper link and a lower link, the upper link and the lower link are arranged in parallel in a horizontal direction and spaced apart in a vertical direction;
- a middle upright rod is vertically connected between the upper link and the lower link;
- an upper supporting rod, a first end of the upper supporting rod being pivotally connected to the upper link;
- a lower supporting rod, a first end of the lower supporting rod being pivotally connected to the lower link;
- a foot frame arranged in a vertical direction, a top end of the foot frame being pivotally connected to a second end of the upper supporting rod, and a bottom end of the foot frame being pivotally connected to a second end of the lower supporting rod; and
- a handle, wherein a head end of the handle extends into the lower supporting rod, a tail end of the handle is pivotally connected to the lower supporting rod, a sliding sleeve is sleeved on the handle and is slidably disposed on the handle, and the sliding sleeve is further pivotally connected to the upper supporting rod.

14. A frame of a double-person baby carriage comprising an extended position and a folded position, wherein the frame of the double-person baby carriage further comprising:
- an upper link and a lower link, the upper link and the lower link are arranged in parallel in a horizontal direction and spaced apart in a vertical direction;
- a middle upright rod is vertically connected between the upper link and the lower link;
- an upper supporting rod, a first end of the upper supporting rod being pivotally connected to the upper link;
- a lower supporting rod, a first end of the lower supporting rod being pivotally connected to the lower link;
- a foot frame arranged in a vertical direction, a top end of the foot frame being pivotally connected to a second end of the upper supporting rod, and a bottom end of the foot frame being pivotally connected to a second end of the lower supporting rod; and
- a handle and a handle adjustment mechanism for locking or unlocking a position of the handle,
- wherein the handle adjustment mechanism includes a first joint, a second joint, and a driving member, the first joint is pivotally connected to the second joint via a pivot, the second joint is axially movable in respect to the first joint to lock or unlock the first joint, the driving member is sleeved on the pivot and located between the first joint and the second joint, the driving member is rotatable in respect to the pivot, rotating of the driving member links the second joint to move in respect to the first joint, so as to lock or unlock the first joint, the first joint is fixedly connected to the upper supporting rod and/or the first connecting rod, and the second joint is fixedly connected to the handle.

15. The frame of the double-person baby carriage according to claim 14, wherein the handle adjustment mechanism further includes an unlock operating member disposed on the handle, the unlock operating member links the driving member to perform a rotation motion around the pivot.

16. The frame of the double-person baby carriage according to claim 15, wherein the handle adjustment mechanism further comprises a linkage member, one end of the linkage member being connected to the unlock operating member, and the other end of the linkage member being connected to the driving member.

17. The frame of the double-person baby carriage according to claim 16, wherein the unlock operating member includes a housing sleeved on the handle, an operating part movable in respect to the housing, and a pivoting member, the housing has a receiving cavity, the pivoting member is located in the receiving cavity, the pivoting member is pivotally connected to the housing and connected to the linkage member, and moving of the operating part in respect to the housing links the pivoting member to pivot, so that the pivoting member pulls the linkage member,
- wherein the operating part includes a chute, moving of the operating part brings the chute to move, and when the chute contacts the pivoting member, the pivoting member is driven to pivot.

18. The frame of the double-person baby carriage according to claim 14, wherein one of the first joint and the second joint has a locking part, and the other one of the first joint and the second joint has a sub-locking part engaged with the locking part.

19. The frame of the double-person baby carriage according to claim 18, wherein the locking part is a gear, the sub-locking part is a gear groove, and the second joint moves axially to cause the sub-locking part to engage or disengage with the locking part.

20. The frame of the double-person baby carriage according to claim 14, wherein rotating of the driving member pushes the second joint away from the first joint to unlock.

21. The frame of the double-person baby carriage according to claim 20, wherein the driving member includes a protruding part, the second joint includes a long driving groove cooperating with the protruding part, and rotating of the driving member causes the protruding part to slide along the long driving groove to push the long driving groove, so as to push the second joint,
- wherein a bottom of the long driving groove is gradually inclined inward along a rotation direction of the protruding part.

22. The frame of the double-person baby carriage according to claim 14, wherein the handle adjustment mechanism further includes a second elastic resetting member which is disposed between the second joint and the driving member, and the second elastic resetting member biases the second joint and the first joint to lock.

* * * * *